D. T. WALLACE.
NUT LOCK.
APPLICATION FILED APR. 21, 1920.
1,388,393.  Patented Aug. 23, 1921.
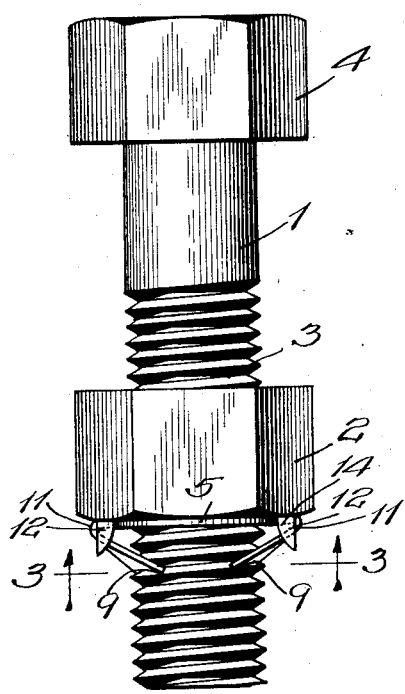
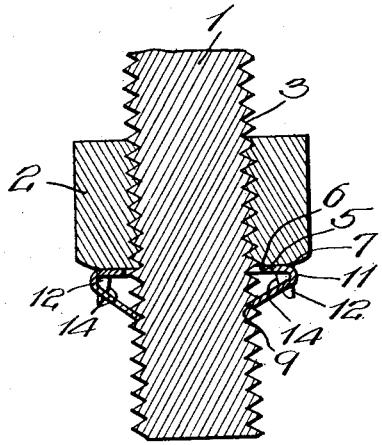
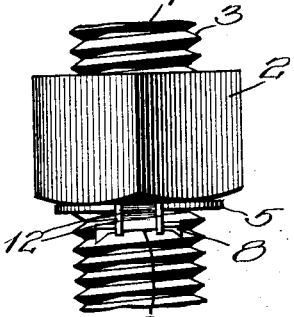
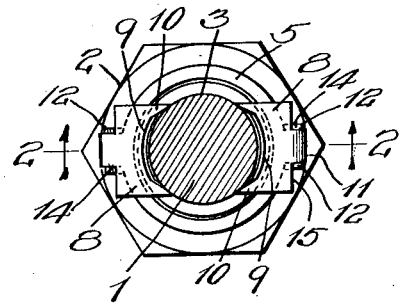
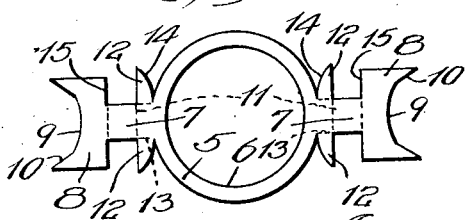
Witnesses:
W. F. Kilroy
Harry R. L. White
Inventor:
David T. Wallace
By Hice & Hice
Attys.

UNITED STATES PATENT OFFICE.

DAVID T. WALLACE, OF MINNEAPOLIS, MINNESOTA.

NUT-LOCK.

1,388,393.   Specification of Letters Patent.   Patented Aug. 23, 1921.

Application filed April 21, 1920. Serial No. 375,520.

*To all whom it may concern:*

Be it known that I, DAVID T. WALLACE, a citizen of the United States, residing at Minneapolis, in the county of Hennepin and State of Minnesota, have invented certain new and useful Improvements in a Nut-Lock, of which the following is a description.

My invention relates to that general class of devices known as nut locks for securing nuts or the equivalent in position upon bolts and preventing accidental displacement thereof. My invention has among its objects the production of a device of the kind described that is simple, convenient, durable, reliable, efficient, inexpensive and satisfactory for use wherever found applicable. It has particularly as an object the production of a device which may be employed in connection with standard bolts and nuts without in any way modifying the bolts or nuts and without impairing their efficiency. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a side elevation of my device in operative position upon the bolt;

Fig. 2 is a sectional view taken substantially on line 2—2 of Fig. 3;

Fig. 3 is a sectional view taken substantially on line 3—3 of Fig. 1;

Fig. 4 is a side elevation similar to Fig. 1 showing the adjacent side of the device to that shown in Fig. 1; and Fig. 5 is a plan view of a blank before bending.

Referring to the drawings, in which the preferred form of my device is shown, 1 represents a bolt of suitable size, shape and material, and 2 a nut also of suitable size, shape and material and threaded internally to engage with the thread 3 on the bolt. The bolt is shown provided with a head 4 of suitable size and shape, it being understood that the bolt and nut represent any desired construction and are shown for the purpose of illustrating the application and operation of my improved nut lock.

My improved lock consists of a part preferably of metal and of the desired strength and resiliency, which is first blanked out and thence formed up ready for application. As shown, the same consists of a body part 5 formed with an opening 6 therethrough of a size to fit over the bolt and not engage the threads, as is most clearly shown in Fig. 2. Formed on the part 5 are one or more tongues or extending parts 7, each of which is preferably formed with an enlarged end portion 8 cut away at the extreme end as at 9 so as to substantially fit the periphery of the bolt adjacent the bottom of the thread, as most clearly shown in Fig. 3. The same is, however, preferably made with sharp corners indicated at 10 which will bind against or bite into the bolt as shown in the figure just referred to. The same is also provided with one or more projecting parts 12 which are formed with cam faces 14 arranged to coöperate with the faces or edges 15 on the end part 8 when the parts are formed. In forming the parts the portions 12 are preferably turned back or bent substantially at the point 13 (see Figs. 1 and 4). The portion 8 is preferably bent back at 11 and over portions 12 so that the back edges or faces 15 will be in position to coöperate with or engage the cam faces 14, the parts 12 substantially forming abutments.

The locking member or nut lock is applied substantially as indicated in Fig. 1, the same being turned down by a wrench or the equivalent until the body portion 5 engages with the end of the nut, and end portions 8 substantially loosely engaging at the base of the threads. As the same is turned down further, the edges 9 tend to pinch the bolt at the base of the thread, the free ends following the thread being moved toward the nut by the turning of the nut lock. However, the edges 15 abutting against the faces 14 tend to stiffen the extending portion and prevent the same from yielding or springing at the bent over portion 11. The tighter the nut lock is turned down, the more firmly it takes hold. There is no tendency for the nut lock to turn off as the engagement of the faces 9 and side portions 10 tend to firmly lock the same against accidental turning, the same impinging into the material of the bolt. Should the nut tend to back off, the same only makes the locking more secure as it works on the portion 5 causing that to travel with the nut, and the abutting on the cam faces 14 tends to force the turned over portion 8 more securely into engagement with the bolt.

It will be noted, however, that it is possible to remove the device without materially injuring the nut or bolt by turning it with a wrench. It will be seen that with this style of nut lock the bolt and nut are standard so that there is no additional expense in manufacturing or providing a specially constructed nut or a specially constructed bolt. The device is simple to manufacture as it may be readily blanked out and formed, a fine degree in accuracy in the manufacture not being required. The same may be made with any desired number of extending parts 7 and 8 and 12, two or more, however, being preferred. Where more than one is employed, should one for any reason give way and fracture by bending or by being accidentally struck, the remaining portion or portions will retain the device in place and will perform all of the functions described.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a threaded bolt and a nut coöperating with said bolt, and a washer mounted on said bolt and provided with an extended portion at one side bent back upon itself and of a length to engage with the bolt at the base of the thread therein at a point at one side of the washer, and means on said extending part and integral therewith for engaging said bent over portion on the sides at the rear edges and transmitting thrust directly between the nut and said bent over portions upon movement of the nut, whereby the bent over portion is maintained in engagement with the bolt and rotation of the nut and washer prevented.

2. In a device of the kind described and in combination, a threaded bolt and a nut coöperating with said bolt, and a washer mounted on said bolt and provided with extended portions at opposite sides, each bent back upon itself and of a length to engage with the bolt at the base of the thread therein at points at opposite sides of the washer, and means integral with said extended portions and lying in a plane perpendicular to said bent over portions for engaging said bent over portions at the sides upon movement of the nut, whereby the bent over portions are forced into engagement with the bolt and rotation of the nut and washer prevented.

3. In a device of the kind described and in combination, a nut lock consisting of a washer having an opening of a size to receive a bolt, and provided with tongue portions extending radially from the sides thereof and each formed with a lateral extension at each side adjacent the end, the free end being bent over and back upon itself at an angle to the tongue portions at the inner portion thereof, and means on the tongue adjacent the inner end thereof for engaging said laterally extending portions when the free end of the tongue is brought closer to the body of the washer.

4. In a device of the kind described and in combination, a nut lock consisting of a washer having an opening of a size to receive a bolt, and provided with resilient tongue portions extending radially from the sides thereof and each formed with a lateral extension at each side adjacent the end, the free end being substantially semi-circular in outline, the free end being bent over and back upon itself at an angle to the tongue portions at the inner portion thereof, and means on the tongue adjacent the inner end thereof for engaging said laterally extending portions when the free end of the tongue is brought closer to the body of the washer.

5. In a nut lock of the kind described and in combination, a bolt having a thread formed therein, a nut threaded to engage the thread on said bolt, a locking member consisting of a part constructed with an opening at its center of a size slightly greater than the diameter of the bolt, said part provided with a radially extending tongue on one or more sides formed integrally with the part and each having its free end bent over adjacent the bolt and at an angle thereto, and constructed at the free end to engage with the bolt, and means on said extending part or tongue for engaging said extending end when the free end of the tongue is in engagement with the bolt.

6. In a nut lock of the kind described and in combination, a bolt having a thread formed therein, a nut threaded to engage the thread on said bolt, a locking member consisting of a part constructed for engagement with the nut and with an opening at its center of a size slightly greater than the diameter of the bolt, said part provided with a radially extending tongue on one or more sides formed integrally with the part and having its free end bent over adjacent the bolt and at an angle thereto, and constructed at the free end to positively engage with the bolt, and means on each tongue for engaging said bent over end when the free end of the tongue is in engagement with the bolt.

7. A nut lock formed of a one-piece blank having an opening of a size slightly larger than the diameter of the bolt with which it is to be used, and a radially extending tongue, said tongue having inner and outer enlarged portions and being reduced in width at its intermediate portion, the free or outer end of said tongue having its outer edge recessed between the sides to form prongs, the inner edge of the enlarged free end being perpendicular to the sides of said reduced tongue portion, the inner enlarged portion being in the form of laterally projecting ears having their forward edge perpendicular to the sides of said reduced tongue portion and their rear edges rounded, whereby when the tongue is bent transversely of itself at the reduced portion and said ears are bent transversely to said bent free end, said rounded edges of the ears will engage the rear edges of the enlarged free tongue end, and tend to keep the prongs of the tongue end in engagement with the threads of the bolt.

In testimony whereof, I have hereunto signed my name in the presence of two subscribing witnesses.

DAVID T. WALLACE.

Witnesses:
Roy W. Hill,
Blanche Chalmers.